United States Patent Office 3,389,108
Patented June 18, 1968

3,389,108
PRINTING FLUID COMPRISING AN AQUE-
OUS SOLUTION OF A WATER-SOLUBLE
DYE AND A THERMOSETTING VINYL-
SULFONIUM POLYMER
Morris L. Smith, Lawnside, N.J., and Guido Roccheggiani,
Bala Cynwyd, and Robert W. Faessinger, Media, Pa.,
assignors to Scott Paper Company, Delaware County,
Pa., a corporation of Pennsylvania
No Drawing. Continuation-in-part of application Ser. No. 424,222, Jan. 8, 1965. This application July 19, 1967, Ser. No. 654,371
12 Claims. (Cl. 260—29.6)

ABSTRACT OF THE DISCLOSURE

Aqueous, low-viscosity, printing fluids containing a water-soluble, thermosetting, vinylsulfonium polymer resin and a water-soluble dye which is compatible with the resin in solution. These printing fluids are useful in high speed printing processes.

Cross references to related applications

This application is a continuation-in-part of copending application Ser. No. 424,222, filed on Jan. 8, 1965, now abandoned; and is closely related to copending applications Ser. Nos. 424,220, now abandoned; 424,226, now abandoned, and 424,248, all of which were also filed on Jan. 8, 1965; and to copending application Ser. No. 619,210, filed on Feb. 28, 1967.

BACKGROUND OF THE INVENTION

Field of the invention

This invention pertains to novel printing fluids; more particularly, this invention relates to certain aqueous printing fluids which are mixtures of self-curing, water-soluble, thermosetting, vinylsulfonium polymer resins and particular water-soluble dyes suitable for printing unsized webs at high printing velocities, for example, up to about 5,000 ft./min. and over. The printed products obtained by printing with these novel printing fluids are also within the purview of this invention.

Description of the prior art

In most of prior-art rotogravure processes pigmented printing fluids containing high vapor pressure solvents as carrier fluids have been used. These fluids contain dispersed particulate matter of great hiding power. Particles dispersed within these fluids give the tinctorial strength needed for printing when these fluids are deposited on the surface of the printed web and the solvent removed thereafter.

While the final print quality of these fluids is often excellent, the process possesses inherent limitations such as the velocity at which the web may be printed, as well as the rate of solvent removal from the pigmented fluids. Needless to say, the many dangers inherent in using high-vapor pressure solvents are considerable. Also, eliminating such a drying step if comparable or better economic results can be obtained is obviously a desideratum.

Other prior-art shortcomings, in comparison with this process, are the life span of the rotogravure roll or intaglio surface because the pigmented particulate materials abrade the roll surface in places of contact with another surface such as the printing nip, and doctor blades.

Still other shortcomings found in prior-art rotogravure printing are the higher viscosities of printing fluids. The viscosity, coupled with the abrasive nature of the fluid, illustrates why rotogravure rolls are short-lived in comparison with this process.

Additionally, the high viscosity of the prior-art fluids prevents the printing process from running at high speeds. For example, at high speeds the tackiness of the prior-art fluids would cause fiber "picking" or removal from the web and also at still higher viscosities this tackiness causes the paper to wrap itself around the printing surface. This phenomenon is avoided by reducing the viscosity of the printing fluid by adding solvent.

Therefore, it is obvious that any change in one property of the fluid will significantly alter other properties of the fluid if the nature of the prior art system is significantly changed to obtain improved results.

SUMMARY OF THE INVENTION

It has now been found that a completely new and unobvious approach in printing fluids does overcome most of the prior-art shortcomings and allows the printing operations to be carried out at web velocities up to about 5,000 ft./min. and higher or a web velocity of about a mile per minute at a cost substantially lower than achievable by any prior-art processes. The novel printing fluid suitable for rotogravure printing at web velocities up to about 5,000 ft./min. comprises an aqueous solution of a thermosetting resin of the polyvinyl sulfonium type, a dye compatible with said resin, said dye and resin mixture having a stability of from about one hour to in excess of four months and a transference value of from about 0 to about four, and a viscosity at 77° F. of less than about 20 cps.

DESCRIPTION OF THE PREFERRED EMBODIMENTS

In the present invention, thermosetting vinylsulfonium polymer resin means any water-soluble, thermosetting polymeric resin species comprising polymeric units which are derived from or which could be considered to be derived from an organic monomer containing vinyl unsaturation and an electropositive sulfonium group, i.e., a polymeric sulfonium derivative of an alpha-ethylenically unsaturated sulfine. The cationic nature of such water-soluble, vinylsulfonium polymer resin species not only allows for greater polymer affinity for cellulosic fibers but also provides the electrostatic sites necessary for potential salt formation with the dye molecules.

By "thermosetting" is meant the ability of a resin to become hard, durable and insoluble at room temperature or, more rapidly, by the application of heat or some other form of energy. This property is usually associated with a crosslinking reaction of the individual resin molecular species to form a three dimensional network of polymer molecules. In the case of this invention, the cross-linking process involves not only the polymeric vinylsulfonium resin species themselves, but in the presence of a dye having resin-reactive groups the dye molecules become a part of the resultant insoluble three dimensional network.

Solutions of thermosetting resins which are capable of cross-linking to an insoluble, durable state at room temperature upon solvent evaporation are sometimes referred to as "self-curing." However, this curing process can be markedly accelerated by the application of heat and, in some cases, by the inclusion of an acidic catalyst.

The preferred resin solutions are those which are aqueous and contain a thermosetting, vinylsulfonium polymer resin of the type previously described which will "self-cure" with and in some cases without the aid of an acidic catalyst to a hard, insoluble, durable state within about four weeks or less at room temperature.

The resin in solution must also exhibit non-dilatant viscosity characteristics. For purposes of this invention, the described condensates are also limited by the viscosity considerations as set out herein.

The dyes which will find use in this invention must be water-soluble. In addition, such dyes must be compatible with the resin in solution and must be capable of reacting with the cellulose, with the resin or, preferably, with both during the resin curing process. It is obvious, hence, that the greater the reactivity of the dye molecules the lower will be the transference values of the colored imprint.

The water-soluble dyes useful in the novel fluid are generally those with anionic characteristics, i.e., bearing an opposite change to the resin. Although the combination of a cationic resin and an anionic dyestuff is basically incompatible, this difficulty can be overcome by using an amount of resin in excess of the stoichiometric ratio. For example, most watersoluble, thermosetting, vinylsulfonium polymer resins may be made compatible with direct acid and reactive dyes.

This stabilized solution, it is believed, in turn coacts by curing on the fibers in the web and the degree of this reaction is measured by a transference value.

As there are an untold number of dyes and each dye, it has been found, reacts unpredictably vis-a-vis a particular resin, only a certain family of dyes will be operative in this process. However, since the concept of using a particular water-soluble, thermosetting, vinylsulfonium polymer resin with a *particular* dye is novel from the stability aspect as well as the transfer value aspect, many dyes are eliminated on the basis of the first ground as well as on the second. The tests designed to delineate the acceptable dyes from those failing in the instant fluids are set out below and fully discussed. Again, it is stressed that not all dyes meet the first two requirements and that predictability is impossible to establish beforehand. Moreover, in order for the dye to be acceptable, it must be used in quantities such as will establish an acceptable print. Again, this property relates to stability as the dye affects the fluid stability if the dye is present in considerable amounts. In other words, for each particular resin-dye combination a direct relationship exits between fluid stability and the ratio of resin non-volatile solids (N.V.S.) to dye, i.e., stability is adversely affected as the resin to dye ratio decreases.

Obviously, the particular vinylsulfonium polymer resin must be carefully selected, but it is equally important that a proper dye is obtained. This dye may wash out of the resin if it is of less than proper reactivity. Again, the result will be high transference values giving poor printed products.

Other reasons why the self-curing, vinylsulfonium polymer resin and dye solution must be specifically selected are further discussed herein. In other words, besides the properties demanded because of the above disclosed reasons, additional properties described herein must be possessed by the vinylsulfonium resins before these qualify for the present purpose.

In order to delineate the vinylsulfonium polymer resins acceptable in the present invention it has been necessary to develop standards which will measure the resin reactivity as well as the coreactivity of resin and dye. As can be well imagined, the present invention falls in an area where lack of prior art standards have resulted in a vacuum of acceptable standards or measure, which will illustrate the present invention in an acceptable fashion. Thus, the present fluid concept involves (a) a definition of the useful vinylsulfonium polymer resins, (b) a definition of a standard with which useful resin is compared, (c) a definition of the resin-dye system which will cover the concept of this invention, and (d) a delineation of the physical properties of these fluids as there properties further limit the acceptable resin-dye system.

An alternative requirement of the vinylsulfonium polymer resin is that it may be cured in a shorter time, i.e., it may be cured by application of heat. However, self-curing resins are the preferred kind. In general heat curing should be accomplished at temperatures below 350° F.

Besides the above properties which are necessary to establish whether a useful vinylsulfonium polymer resin is suitable as a component for printing purposes, other properties are equally necessary for other reasons. Obviously, the additional properties further limit the above class and eliminate some of the resins.

As has also been indicated hereinabove, another important limit is the transference value of the resin-dye system. This transference value as further described herein is based on the fact that it represents the coaction of the resin-fiber-dye system. The exact chemical nature of the resin-dye-fiber system is unknown and for this reason this arbitrary standard has been defined to test the resin-dye-fiber coaction in order to determine the acceptable *resin-dye solutions*. This test embraces the defining of acceptable dyes in proper concentrations in the resin solution in order to obtain acceptable prints.

Finally, the resin-dye solutions must meet certain physical tests before these solutions may be used for printing purposes in the present process as defined herein.

Physical limits necessary to delineate the acceptable fluids are: (1) viscosity, (2) lack of change of viscosity such as due to change in shearing rate, (3) surface tension, and (4) free from particulate contamination and pigmented particles.

For example, in order to obtain a certain transference value with a certain dye an excess amount of resin may have to be used, this amount of resin may in turn be in excess of the viscosity constraint. (Conversely, the viscosity constraint may be satisfied with the proper amount of resin but an inordinate amount of dye may have to be used with the particular resin and thus the solution may fail because of the resin-dye coaction, i.e., a chemical reaction.)

An example of the types of vinylsulfonium polymer resins which may be employed in this invention are those polymers comprising at least one unit of the general formula:

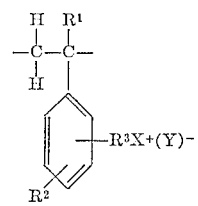

wherein $R^1$ and $R^2$ are selected from the group consisting of hydrogen and alkyl radicals containing from 1 to 6 carbon atoms, $R^3$ is a methylene group or an ethylene group, X is organic sulfur-containing radical selected from the group consisting of (A) sulfides of the formula $R^4SR^5$, wherein $R^4$ and $R^5$ each represents a member of the group consisting of (1) alkyl radicals containing from 1 to 6 carbon atoms, (2) haloalkyl radicals containing from 1 to 6 carbon atoms, (3) hydroxyalkyl radicals containing from 1 to 6 carbon atoms;

(4) $$-(CH_2)_n CHNH_2 \overset{O}{\underset{\|}{C}} - OH$$

wherein $n$ is an integer from 1 to 4 inclusive;

(5) $$-(CH_2)_n CHOHC\overset{O}{\underset{\|}{}} - OH$$

wherein $n$ is an integer from 1 to 4 inclusive;

(6) $\quad -(CH_2CH_2O)_m CH_2CH_2OH$ wherein $m$ is an integer from 1 to 5;

(7) $\quad -C_nH_{2n}COOH$ (8) $\quad -C_nH_{2n}COOC_nH_{2n+1}$ (9) $\quad -C_nH_{2n}COO$ alkali metal; and

(10) $\quad -C_nH_{2n}CONH_2$ wherein $n$ in substituents (7), (8), (9) and (10) is an integer from 1 to 5 with the total number of carbon atoms in each substituents (7), (8), (9) and (10) not exceeding 6, and where the total number of carbon atoms of the $R^4$ and $R^5$ groups attached to a common sulfur atom does not exceed 18 and (B) cyclic thio compounds selected from the group consisting of tetrahydrothiophene, hydroxy substituted tetrahydrothiophene, halo substituted tetrahydrothiophene, alkyl substituted tetrahydrothiophene where alkyl refers to groups containing from 1 to 5 carbon atoms, tetrahydrothiopyran and 1,4-oxathiane; and Y is an anion such as carbonate, oxalate, phthalate, succinate, dihydrogen phosphate, fluoride, benzoate, chloride, nitrate, acetate, sulfate, bromide, iodide and the like. Polymers containing units where $R^1$ is hydrogen and $R_3$ is methylene are preferred.

The homopolymers and copolymers may be lightly cross-linked with any of the conventional cross-linking agents such as divinylbenzene (DVB), the divinyl ether of diethylene glycol, ethylene glycol diacrylate, ethylene glycol, diacrylate, ethylene glycol-dimethacrylate, glycerol trimethacrylate, dialkyl itaconate, diallyl, maleate, diallyl fumarate, diisopropenyl diphenyl, the close homologues, equivalents, and the like of the foregoing, or mixtures thereof. These homopolymers and/or copolymers have been further described in U.S. Patents 3,060,156, 3,078,259, 3,130,117 and 3,216,979, the disclosures of which are incorporated herein by way of reference thereto.

Another example of the types of vinylsulfonium polymer resins which may be employed in this invention are water-soluble polymers comprising at least one unit of the formula:

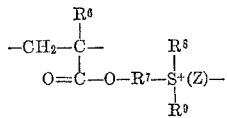

wherein $R^6$ is either a hydrogen atom or a methyl radical; $R^7$ designates an alkylene radical containing from 1 to 4 and preferably from 2 to 3 carbon atoms, such radical more preferably separating the adjacent (in this instance, the oxygen and sulfur) atoms by a carbon chain containing at least 2 carbon atoms; $R^8$ designates an alkyl radical containing from 1 to 4 and preferably from 1 to 2 carbon atoms; $R^9$ designates either a methyl or carboxymethyl (—$CH_2COOH$) radical; and Z designates a halogen atom such as a bromine, iodine or chlorine atom or a methyl sulfate (—$OSO_3CH_3$) radical, and specifically designates a chlorine atom when $R^9$ designates a carboxymethyl radical. Moreover, the sulfonium radical

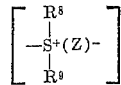

is preferably attached to that carbon atoms of the radical designated by $R^7$ which is farthest from the adjacent oxygen atom, i.e., the carbon atom in the 1-position. In addition to water-soluble homopolymers consisting essentially of units as hereinbefore defined, water-soluble copolymers comprising the above-defined units may also be employed, i.e., copolymers of sulfines having the formula:

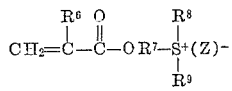

wherein $R^6, R^7, R^8, R^9$ and Z are as hereinbefore defined with at least one other copolymerizable monomer as, for instance, the alkylthioalkyl acrylates and methacrylates represented by the formula:

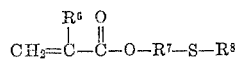

wherein $R^6, R^7$ and $R^8$ are as defined above such as methylthiomethyl acrylate, methylthioethyl acrylate, ethylthioethyl acrylate, butylthioethyl acrylate, methylthiobutyl acrylate, methylthioethyl methacrylate, and the like; acrylamide and lower alkyl substituted acrylamides, such as methacrylamide and N,N-dimethylacrylamide; the vinylbenzenes including vinylbenzene and lower alkyl substituted vinylbenzenes, the alkyl and cyanoalkyl acrylates and methacrylates represented by the formula

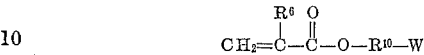

wherein $R^6$ is as defined above, $R^{10}$ designates an alkylene radical containing from 1 to about 10 carbon atoms and preferably from 1 to 4 carbon atoms, and W designates either a hydrogen atom or a cyano (—CN) radical such as methyl acrylate, ethyl acrylate, butyl acrylate, 2-ethylhexyl acrylate, methyl methacrylate, 2-cyanoethyl acrylate, and the like; the vinyl alkanoates represented by the formula

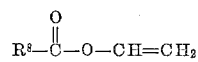

wherein $R^8$ is as defined above, such as vinyl acetate, vinyl propionate, vinyl butyrate, vinyl pentanoate, and the like; the N-alkyl-N-vinylamides represented by the formula

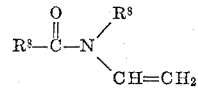

wherein each $R^8$ is independently selected as defined above, such as N-methyl-N-vinylacetamide, N-ethyl-N-vinylacetamide, N-butyl-N-vinylacetamide, N-methyl-N-vinylpropionamide, and the like; and the N-vinylpyrrolidones, such as N-vinyl-2-pyrrolidone; the amount of polymerized sulfine in the interpolymers being sufficient to assure the substantial and preferably complete water solubility of the interpolymers. Found to be particularly effective in this regard, are the interpolymers containing at least 5 mole percent, preferably from about 10 mole percent to about 99 mole percent and more preferably from about 25 mole percent to about 80 mole percent of the sulfine in polymerized form on a theoretical monomer basis, the minimal amount of polymerized sulfine required to assure the water solubility of the interpolymers varying somewhat depending upon the particular comonomer(s) polymerized therewith. These types of vinylsulfonium homopolymers and copolymers are disclosed and described in further detail in U.S. Patents 3,207,656 and 3,214,370, the disclosures of which are incorporated herein by way of reference thereto.

To further improve fluid stability, particularly at low resin-to-dye ratios, additional fluid additives can be incorporated into the printing fluids of this invention, as, for example, formaldehyde, methyl alcohol, glyoxal, glycols, such as ethylene glycol, propylene glycol and low molecular weight polyethylene glycols, glycol ethers, such as Cellosolve and Carbitol, formamide, dimethylformamide, polyvinyl pyrrolidone, tetrahydrofurfuryl alcohol, dimethyl sulfoxide, and the like compounds, such as compounds with hydroxy containing moieties or highly polar unreactive compounds, etc. Urea may also be added to the present fluids for dye solublizing; and, if problems exist with fluid affinity for gravure rolls, which are generally chrome plated, surface-active agents may also be added. Examples of these surface-active agents are non-ionic surface-active agents such as nonylphenoxypoly (ethylene oxide), and others which are obtainable from the Atlas Chemical Corporation, such as the Atmos, Atmul and Tween series of non-ionics.

This printing fluid, as further amplified herein, is suitable for rotogravure intaglio printing of papers having an absorbency time of less than 600 sec./0.01 ml. of water. The more preferred papers have an absorbency rate as depicted in the following table.

TABLE—ABSORBENT PAPERS

| Types of Paper | Most Preferred | More Preferred | Preferred |
|---|---|---|---|
| Multi-Ply Toilet/Facial Tissues: | | | |
| Basis Weight, lb./ream | 9.2–10.7 | 7.5–11.5 | 5.0–15.0 |
| Absorbency, sec./0.10 ml | 0–10 | 0–15 | 0–180 |
| Single Ply Toilet Tissue: | | | |
| Basis Weight, lb./ream | 11.5–14.0 | 9.0–16.0 | 7.0–20.0 |
| Absorbency, sec./0.01 ml | 0–60 | 0–120 | 0–300 |
| Single Ply Towel/Wiper: | | | |
| Basis Weight, lb./ream | 20.0–36.0 | 11.0–40.0 | 10.0–50.0 |
| Absorbency, sec./0.10 ml | 0–60 | 0–360 | 0–600 |
| Multi Ply Towel/Wiper: | | | |
| Basis Weight, lb./ream | 9.0–20.0 | 8.0–21.0 | 5.0–25.0 |
| Absorbency, sec./.01 ml | 0–60 | 0–300 | 0–600 |
| Single Ply Napkin: | | | |
| Basis Weight, lb./ream | 12.0–15.5 | 9.0–19.0 | 6.0–25.0 |
| Absorbency, sec./0.01 ml | 0–100 | 0–360 | 0–600 |
| Multi Ply Napkin: | | | |
| Basis Weight, lb./ream | 9.7–11.1 | 7.0–15.0 | 5.0–20.0 |
| Absorbency, sec./0.10 ml | 0–360 | 0–600 | 0–600 |

Basis weight is expressed in pounds per 24″ x 36″ x 480 sheet ream (2,880 square ft.).

Absorbency is expressed in seconds as the time required for the paper specimen to absorb a specified volume of distilled water. The area of each specimen (obtained from a retail unit) is to be no less than 9 square inches, cut to 3″ x 3″. The specimen to be tested will be suspended in a suitable frame to provide a flat, undistorted surface with no contact on either side of the specimen with any other surface or material. With the specimen thus prepared, the specific volume of water in a single drop will be lowered by appropriately divisioned pipette to the surface of the specimen. Timing begins as the water drop touches the specimen and ends with complete absorption—defined as the instant at which the water on the surface fails to reflect light.

For single-ply tissue and/or napkins _____ 0.01 ml.$H_2O$
For all others _____ 0.10 ml.$H_2O$ Samples from each retail case will be from no less than 10% of the retail package contained therein. Each individual test will be the result of three (3) drops/side, reporting the 6-drop average as the individual test result. The average of these tests will represent the absorbency. The test described above is conducted under atmospheric conditions controlled to 75±2° F. and 60±2% R.H.

Fluid stability at room temperature (77° F.) is herein defined as the period of time intercurring between the manufacture of a fluid and the appearance of physical-chemical changes that would adversely affect operability. These changes usually take place over a period of time and the limiting factors from the standpoint of fluid utilization are the following:

±25% change in fluid viscosity from the original value and a departure from the initial one-phase solution.

Stability is measured on an arbitrary scale defined from most preferred fluids as A, signifying a stability of one month or more, for preferred fluids as B, signifying a stability of one week to a month, for useable fluid as C, the stability ranging from one hour to one week and for unacceptable fluids as O, stability being one hour or less or complete incompatibility in fluid components.

Fluid stability as herein defined is also indicative of "shelf life" or "storage life." Storage life, as defined by the Packaging Institute in the Glossary of Packaging Terms, 2nd ed., Riverside Press, Essex, Conn., 1955, "is the period of time during which a packaged product can be stored under specific temperature conditions and remain suitable for use. Sometimes called shelf life."

Even if a proper amount of dye can be dissolved in the solution it may not be acceptable because of the bleeding in water "or transfer value test."

The novel printing fluids of this invention can also be cleaned which is hardly possibly with the pigmented printing fluids since filtering or centrifugation would remove pigment tinctorial material. This property of fluid gives rise to a recirculating system as, in the case of loosely-bonded absorbent papers, the paper dust and loose fibers must be removed from the fluid in order not to overload the system with particulate materials. Therefore, the need for a low-viscosity aqueous solution is important as these solutions can be easily cleaned or separated from impurities such as by centrifugation. This viscosity criterion is of importance because the impurities are removed by cleaning means such as those based upon differences in specific gravity. Consequently, dust-laden webs as well as loosely-bonded webs can be printed by means of this fluid because they are cleanable.

Transference, as previously mentioned, relates to the ability of the printed area to resist water washing or bleeding after the resin has cured to the thermosetting state.

Transference solutions establishing *the standard values* for the different resin dye mixtures and classifying acceptable fluids are given below:

*Transfer* is herein defined as the amount of tinctorial material removed from the original colored area by the addition of distilled water and transferred to either an unprinted area of the same substrate or onto another substrate when physical contact is established.

Transfer rating scale:

0—No noticeable transfer
1—Very slight (bare noticeable) transfer
2—Slight transfer
3—Moderate transfer
4—Heavy transfer
5—Very heavy transfer The transfer rating scale is based on the intensity of the color removed when compared with the intensity of the original colored area.

Transfer rating is by definition O as a result of carrying out the following experiment: 2 g. of C.I. Direct Blue 1 dyestuff (DuPont Pontamine Sky Blue 6 BX) are dissolved in 50 ml. of distilled water heated to 130° F. and transferred into 50 g. of polyhydroxypolyalkylenepolyurea-formaldehyde condensate (30% N.V.S.), U.S. Patent 2,699,435 (Example 2, appropriately adjusted for its N.V.S. content) Uformite 700 (Rohm & Haas) with agitation. Subsequently, 3 g. of $NH_4Cl$ are added to the dye-resin solution and mixing is continued until the catalyst is completely dissolved. Using a 100 microliter pippette, three-hundredths of one ml. (.03 ml.) of fluid is placed in a #1 Whatman filter paper and dried (cured) for one hour in an oven at 230° F. The colored portion of the filter paper is then immersed for five seconds in distilled water, the excess water is removed by contacting any absorbent medium, and finally the damp test sample is sandwiched between two two-layer pads of No.. 1 Whatman filtered paper. A two-pound weight is placed on the top of the filter pad and remains there for at least ten hours, after which time the sample is removed and the two filter surfaces in contact with the test sample upon examination exhibit no noticeable transfer.

Transfer rating is by definition 1 as a result of carrying out the following experiment: 2 g. of C.I. Direct Blue 1 dyestuff (DuPont Pontamine Sky Blue 6 BX) are dissolved in 50 ml. of distilled water heated to 130° F. and transferred into 50 gr. of polyhydroxypolyalkylenepolyurea-formaldehyde condensate (30% N.V.S.), Patent 2,699,435, Uformite 700 (Rohm & Haas) with agitation. Subsequently, 3 g. of $NH_4Cl$ are added to the dye-resin solution and mixing is continued until the catalyst is completely dissolved. Using a 100 microliter pipette, three-hundreds of one ml. (.03 ml.) of fluid is placed on a #1 Whatman filter paper and dried (cured) for 10 minutes in an oven at 230° F. The colored portion of the filter paper is then immersed for five seconds in distilled water, the excess water is removed by contacting any absorbent medium, and finally the damp test sample is sandwiched between two two-layer pads of #1 Whatman filter paper. A two-pound weight is placed on the top of the filter pad and remains there for at least ten hours after which time the sample is removed and the two filter surfaces in contact with the test sample upon examination exhibit a very slight (barely noticeable) transfer.

Transfer rating is by definition 2 as a result of carrying out the following experiment: 2 g. of C.I. Direct Blue 1 dyestuff (DuPont Pontamine Sky Blue 6 BX) are dissolved in 50 ml. of distilled water heated to 130° F. and transferred into 50 g. of polyhydroxypolyalkylenepolyurea-formaldehyde condensate (30% N.V.S.) U.S. Patent 2,699,435, Uformite 700 (Rohm & Haas) with agitation. Subsequently, 0.5 g. of $NH_4Cl$ is added to the dye-resin solution and mixing is continued until the catalyst is completely dissolved. Using a 100 microliter pipette, three-hundredths of one ml. (.03 ml.) of fluid is placed on a #1 Whatman filter paper and dried (cured) for one hour in an oven at 230° F. The colored portion of the filter paper is then immersed for five seconds in distilled water, the excess water is removed by contacting any absorbent medium, and finally the damp test sample is sandwiched between two two-layer pads of #1 Whatman filter paper. A two-pound weight is placed on the top of the filter pad and remains there for at least ten hours, after which time the sample is removed and the two filter surfaces in contact with the test sample upon examination exhibit a slight transfer.

Transfer rating is by definition 3 as a result of carrying out the following experiment: 2 g. of C.I. Direct Blue 1 dyestuff (DuPont Pontamine Sky Blue 6 BX) are dissolved in 50 ml. of distilled water heated to 130° F. and transferred into 50 g. of polyhydroxypolyalkylenepolyurea-formaldehyde condensate (30% N.V.S.), U.S. Patent 2,699,435, Uformite 700 (Rohm & Haas) with agitation. Subsequently, 0.5 g. of $NH_4Cl$ is added to the dye-resin solution and mixing is continued until the catalyst is completely dissolved. Using a 100 microliter pipette, three-hundredths of one ml. (.03 ml.) of fluid is placed on a #1 Whatman filter paper and dried (cured) for 30 minutes in an oven at 230° F. The colored portion of the filter paper is then immersed for five seconds in distilled water, the excess water is removed by contacting any absorbent medium, and finally the damp test sample is sandwiched between two two-layer pads of #1 Whatman filter paper. A two-pound weight is placed on top of the filter pad and remains there for at least ten hours, after which time the sample is removed and the two filter surfaces in contact with the test sample upon examination exhibit a moderate transfer.

Transfer rating is by definition 4 as a result of carrying out the following experiment: 2 g. of C.I. Direct Blue 1 dyestuff (DuPont Pontamine Sky Blue 6 BX) are dissolved in 50 ml. of distilled water heated to 130° F. and transferred into 50 g. of polyhydroxypolyalkylenepolyurea-formaldehyde condensate (30% N.V.S.), U.S. Patent 2,699,435, Uformite 700 (Rohm & Haas) with agitation. Subsequently, 0.5 g. $NH_4Cl$ is added to the dye-resin solution and mixing is continued until the catalyst is completely dissolved. Using a 100 microliter pipette, three-hundredths of one ml. (0.3 ml.) of fluid is placed on a #1 Whatman filter paper and dried (cured) for 15 minutes an an oven at 230° F. The colored portion of the filter paper is then immersed for five seconds in distilled water, the excess water is removed by contacting any absorbent medium, and finally the damp test sample is sandwiched between two two-layer pads of #1 Whatman filter paper. A two-pound weight is placed on the top of the filter pad and remains there at least ten hours, after which time the sample is removed and the two filter surfaces in contact with the test sample upon examination exhibit a heavy transfer.

Transfer rating is by definition 5 as a result of carrying out the following experiment: 2 g. of C.I. Direct Blue 1 dyestuff (DuPont Pontamine Sky Blue 6 BX) are dissolved in 50 ml. of distilled water heated to 130° F. and transferred into 50 g. of polyhydroxypolyalkylenepolyurea-formaldehyde condensate (30% N.V.S.), U.S. Patent 2,699,435 Uformite 700 (Rohm & Haas) with agitation. Subsequently, the dye-resin solution pH is adjusted to 10 by addition of 20 drops of saturated NaOH solution and mixed until the catalyst is completely dissolved. Using a 100 microliter pipette, three-hundredths of one ml. (.03 ml.) of fluid is placed on a #1 Whatman filter paper and sample remains uncured (not oven dried). The colored portion of the filter paper is then immersed for five seconds in distilled water, the excess water is removed by contacting any absorbent medium, and finally the damp test sample is sandwiched between two two-layer pads of #1 Whatman filter paper. A two-pound weight is placed on the top of the filter pad and remains there at least ten hours, after which time the sample is removed and the two filter surfaces in contact with the test sample upon examination exhibit a very heavy transfer.

For the process to be operative at the high-web velocities such as above, 5,000 ft./min. the viscosity of the fluid must be kept within certain limits. At lower web velocities the viscosity may be higher such as about 20 cps., but again, a more viscous fluid picks up more fiber and may be harder to clean and for this reason is not desirable. For purposes of this process viscosities below 15 cps. are preferred. The preferred range of viscosity for the fluid is of from about 3 cps. to 10 cps. while the most preferred range is about 3 cps. to about 7 cps. at 77° F.

In the instant case procedure for determination of liquid viscosities by the Cannon-Fenske Route Viscometer was used. Equipment needed for viscosity determination includes a constant temperature bath, a timer and the proper size Cannon-Fenske Route Viscometer tube. Size 50 tube is recommended for a range of 0.8 to 3.2 centistokes, size 100 tube for 3 to 12 centistokes, size 150 tube for 7 to 28 centistokes and size 200 tube for 20 to 80 centistokes.

The bath temperature is maintained at 25.0° C.±0.1° C. The viscosity in centipoises is then calculated by multiplying the centistoke viscosity by the liquid density at 25° C. The liquid density at 25° C. is calculated by the following equation: Density of liquid at 25° C.=(sp. g. @ $t$ ° F.) (dens. water at 60° F.).

$$\frac{\text{dens. water at 25° C}}{\text{dens. water at t° F}} = (.00610) \frac{(\text{sp. g. @ t° F})}{(\text{dens. water at t° F})}$$

The above procedure as employed herein is discussed by M.R. Cannon in Ind. Eng. Chem., Anal., Ed., 10,297 (1938).

In another aspect the present fluid differs from those of prior art, namely, surface tension. While most of the prior art fluids are designed with low surface tension characteristics to allow the wetting of the roll by the viscous fluid, presently defined fluids are operable at high-surface tension values because low viscosity fluid wets the intaglio surface at acceptable rates. Depending on the degree of surface wetting the surface tension may be varied by adding minor amounts of wetting agents to give the best results. The preferred values are below 50 dynes/cm. and below the surface value of pure water (72 dynes/cm.). An acceptable range is of from about 30 dynes/cm. to about 60 dynes/cm. The surface tension is measured by means of Cenco-duNouy tensiometer.

In comparing the print obtained by means of the prior art pigmented rotogravure inks with the print obtained by the novel fluid the following differences exist. The prior art inks are opaque, i.e., they have considerable hiding power (impervious to the rays of light). On the other hand, the present dyes are transparent although these may be colored. The color value adjustment in prior art is obtained by adding white pigment and coloring. In the present fluids it is performed by preparing a different fluid with a different dye concentration. In practicing this invention, the white pigment is not needed and its place is taken by the color of the substrate, i.e., the color of fibers which are for the most part white for bleached pulp. Consequently a component previously required in a rotogravure ink is now eliminated. Of course, the printing of colored base sheets necessitates the use of colors that, upon becoming deposited on the base sheets, will give the needed color, e.g., a blue base sheet must be printed with yellow dye-resin solution to obtain a green color.

Besides the above factors which contribute to the acceptance of the present fluids, the cost factor is an equally important consideration herein. For example, the cost as well as the necessity of grinding of pigment is eliminated because no pigment is used in this process. Reproducibility of color is extremely good because of standardized dyes and standardized colors. Uniformity of fluid concentration is easily maintained even during very long runs as no large amounts of volatile solvents are used which require constant adustment. Needless to say, these advantages render the present fluid much less costly and especially suitable for modern mass production methods.

The following examples will serve further to illustrate the invention:

EXAMPLE 1

1 part by weight of the direct dye, C.I. Direct Red 81, Pontamine Fast Red 8 BLX, was dissolved in 100 parts of water with agitation and heating to approximately 140° F. The resulting solution was added slowly with agitation to a second vessel containing 100 parts by weight of (N.V.S., 13.25%) an aqueous solution of a homopolymeric vinylsulfonium compound of the class particularized in U.S. Patents 3,130,117 and 3,078,259, i.e., a vinylsulfonium compound consisting essentially of units of the formula

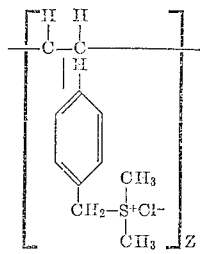

wherein Z is an integer greater than 10. The resulting solution was agitated for 15 minutes.

The fluid had the following properties: pH, 1.4; specific gravity, 1.019; viscosity, 6.88 cps.; stability, 2 weeks.

The fluid was printed with a 15" wide laboratory rotogravure printing unit at speeds up to 240 f.p.m. on soft, absorbent, 2-ply dry crepe tissue, i.e., facial and toilet types. The paper had an attractive red design imprinted thereon which print had a color transfer rating of 0 after 4 weeks aging at room temperature.

EXAMPLE 2

1 part by weight of a direct dye, C.I. Direct Red 37, Chloramine Red B, Sandoz, was dissolved in 100 parts of water with agitation and heating to 130° F. The resulting solution was added slowly with agitation to 100 parts by weight of polyvinyl sulfonium copolymer solution of Example 1 having a non-volatile solids content of approximately 21%. The resulting solution was agitated for 15 minutes and enough $NaHCO_3$ added to raise pH to 6.9.

The fluid had the following properties: pH, 6.9; stability, better than 2 months.

The fluid was applied by a hand operated simulated rotogravure method on soft, absorbent, 2-ply dry crepe paper, i.e. facial tissue. The red imprinted area had a transfer rating of 0 after 4 weeks of aging at room temperature (77° F.±10° F.).

EXAMPLE 3

1 part by weight of a direct dye, C.I. Direct Red 23, Direct Fast Scarlet SE, Ciba, was dissolved in 100 parts of water with agitation and heating to 130° F. The resulting solution was added slowly with agitation to 100 parts by weight of vinylsulfonium polymer resin solution of Example 1 having a non-volatile solids content of approximately 21%. The resulting solution was agitated for 15 minutes and enough $NaHCO_3$ added to bring pH in the 5.5–6.0 range.

The fluid had the following properties: pH, 5.8; stability, better than 1 month.

The fluid was applied by a hand-operated simulated rotogravure method on soft, absorbent, 2-ply dry crepe paper, i.e., facial tissue. The red imprinted area had a transfer rating of 0 after 4 weeks of aging at room temperature (77° F.±10° C.).

EXAMPLE 4

1 part by weight of a direct dye, C.I. Direct Red 2, Erie Benzo 4BP conc. special, National, was dissolved in 100 parts of water with agitation and heating to 130° F. The resulting solution was added slowly with agitation to 100 parts by weight of vinylsulfonium polymer solution of Example 1 having a nonvolatile solids content of approximately 21%. The resulting solution was agitated for 15 minutes.

The fluid had the following properties: pH, 2.35; stability, 2 months.

The fluid was applied by a hand-operated simulated rotogravure method on soft, absorbent, 2-ply dry crepe paper, i.e., facial tissue. The red imprinted area had a transfer rating of 0 after 4 weeks of aging at room temperature (77° F.±10° F.).

EXAMPLE 5

1 part by weight of an acid dye, C.I. Acid Red 26, Acid Scarlet 2R, Sandoz, was dissolved in 100 parts of water with agitation and heating to 130° F. The resulting solution was added slowly with agitation to 100 parts by weight of resin solution of Example 1 having a nonvolatile solids content of approximately 21%. The resulting solution was agitated for 15 minutes.

The fluid had the following properties: pH, 1.8; stability, 2 months.

The fluid was applied by a hand-operated simulated rotogravure method on soft, absorbent, 2-ply dry crepe paper, i.e. facial tissue. The red imprinted area had a transfer rating of 0 after 4 weeks of aging at room temperature (77° F.±10° F.).

EXAMPLE 6

1 part by weight of an acid dye, C.I. Acid Red 25L, Ciabacron Brilliant Red BL, Ciba, was dissolved in 100 parts of water with agitation and heating to 130° F. The resulting soluttion was added slowly with agitation to 100 parts by weight of vinylsulfonium polymer solution of Example 1 having a nonvolatile solids content of approximately 21%. The resulting solution was agitated for 15 minutes.

The fluid had the following properties: pH, 1.4; stability, 6 months.

The fluid was applied by a hand-operated simulated rotogravure method on soft, absorbent, 2-ply dry crepe paper, i.e., facial tissue. The red imprinted area had a transfer rating of 0 after 4 weeks of aging at room temperature (77° F.±10° F.).

EXAMPLE 7

1 part by weight of a direct dye, C.I. Direct Yellow 28, Chloramine Fast Yellow FF extra conc., Sandoz, was dissolved in 100 parts of water with agitation and heating to 130° F. The resulting solution was added slowly with agitation to 100 parts by weight of resin solution of Example 1 having a non-volatile solids content of approximately 21%. The resulting solution was agitated for 15 minutes, and the pH adjusted to 8 with sodium bicarbonate.

The fluid had the following properties: pH, 8.2; stability, better than 3 months.

The fluid was applied by a hand-operated simulated rotogravure method on soft, absorbent, 2-ply dry crepe paper, i.e., facial tissue. The yellow imprinted area had a transfer rating of 0 after 4 weeks of aging at room temperature (77° F.±10° F.).

EXAMPLE 8

1 part by weight of a direct dye, C.I. Direct Yellow 4, Brilliant Paper Yellow C. conc., National, was dissolved in 100 parts of water with agitation and heating to 130° F. The resulting solution was added slowly with agitation to 100 parts by weight of vinylsulfonium polymer solution of Example 1 having a non-volatile solids content of approximately 21%. The resulting solution was agitated for 15 minutes.

The decofluid had the following properties: pH, 0.6; stability, 4 months.

The fluid was applied by a hand-operated simulated rotogravure method on soft, absorbent, 2-ply dry crepe paper, i.e., facial tissue. The yellow imprinted area had a transfer rating of 0 after 4 weeks of aging at room temperature (77° F.±10° F.).

EXAMPLE 9

1 part by weight of an acid dye, C.I. Acid Yellow 3, Chinoline Yellow 0 conc., Sandoz, was dissolved in 100 parts of water solution with agitation and heating to 130° F. The resulting solution was added slowly with agitation to 100 parts by weight of vinylsulfonium polymer solution of Example 1 having a non-volatile solids content of approximately 21%. The resulting solution was agitated for 15 minutes.

The fluid had the following properties: pH, 1.3; stability, 6 months.

The fluid was applied by a hand-operated simulated rotogravure method on soft, absorbent, 2-ply dry crepe paper, i.e., facial tissue. The yellow imprinted area had a transfer rating of 0 after 4 weeks of aging at room temperature (77° F.±10° F.).

EXAMPLE 10

1 part by weight of a direct dye, C.I. Direct Green 26, Pyrazol Fast Green BL, Sandoz, was dissolved in 100 parts of water with agitation and heating to 130° F. The resulting solution was added slowly with agitation to 100 parts by weight of vinylsulfonium polymer solution of Example 1 having a non-volatile solids content of approximately 21%. The resulting solution was agitated for 15 minutes.

The fluid had the following properties: pH, 0.5; stability, 3 months.

The fluid was applied by a hand-operated simulated rotagravure method on soft, absorbent, 2-ply dry crepe paper, i.e., facial tissue. The green imprinted area had a transfer rating of 0 after 4 weeks of aging at room temperature (77° F.±10° F.).

EXAMPLE 11

1 part by weight of an acid dye, C.I. Acid Green 3, Acid Green 2G conc. (Sandoz) was dissolved in 100 parts of water with agitation and heating to 130° F. The resulting solution was added slowly with agitation to 100 parts by weight of resin solution of Example 1 having a non-volatile solids content of approximately 21%. The resulting solution was agitated for 15 minutes.

The fluid had the following properties: pH, 1.9; stability, better than 3 months.

The fluid was applied by a hand-operated simulated rotogravure method on soft, absorbent, 2-ply dry crepe paper, i.e., facial tissue. The green imprinted area had a transfer rating of 0 after 4 weeks of aging at room temperature (77° F.±10° F.).

EXAMPLE 12

1 part by weight of a direct dye, C.I. Direct Blue 1, Chloramine Skyblue FF conc. Supra, Sandoz, was dissolved in 100 parts of water with agitation and heating to 130° F. The resulting solution was added slowly with agitation to 100 parts by weight of vinylsulfonium polymer solution of Example 1 having a non-volatile solids content of approximately 21%. The resulting solution was agitated for 15 minutes.

The fluid had the following properties: pH, 0.5; stability, better than 2 months.

The fluid was applied by a hand-operated simulated rotogravure method on soft, absorbent, 2-ply dry crepe paper, i.e., facial tissue. The blue imprinted area had a transfer rating of 0 after 4 weeks of aging at room temperature (77° F.±10° F.).

EXAMPLE 13

1 part by weight of a direct dye, C.I. Direct Blue 25, Direct Brilliant Blue P-5 BC was dissolved in 100 parts of water with agitation and heating to 130° F. The resulting solution was added slowly with agitation to 100 parts by weight of resin solution of Example 1 having a non-voltaile solids content of approximately 21%. The resulting solution was agitated for 15 minutes.

The fluid had the following properties: pH, 0.7; stability, 3 months.

The fluid was applied by a hand-operated simulated rotogravure method on soft, absorbent, 2-ply dry crepe paper, i.e., facial tissue. The blue imprinted area had a transfer rating of 0 after 4 weeks of aging at room temperature (77° F.±10° F.).

EXAMPLE 14

1 part by weight of a direct dye, C.I. Direct Orange 26, chloramine Fast Orange SE Extra conc., Sandoz, was dissolved in 100 parts of water with agitation and heating to 130° F. The resulting solution was added slowly with agitation to 100 parts by weight of resin solution of Example 1 having a non-volatile solids content of approximately 21%. The resulting solution was agitated for 15 minutes.

The fluid had the following properties: pH, 0.8; stability, better than 2 months.

The fluid was applied by a hand-operated simulated rotogravure method on soft, absorbent, 2-ply dry crepe paper, i.e., facial tissue. The orange imprinted area had a transfer rating of 0 after 4 weeks of aging at room temperature (77° F.±10° F.).

EXAMPLE 15

1 part by weight of a direct dye, C.I. Direct Orange 51, Chlorantine Fast Orange 2 GL, was dissolved in 100 parts of water with agitation and heating to 130° F. The resulting solution was added slowly with agitation to 100 parts by weight of resin solution of Example 1 having a non-volatile solids content of approximately 21%. The resulting solution was agitated for 15 minutes.

The fluid had the following properties: pH, 0.7; stability, 2 months.

The fluid was applied by a hand-operated simulated rotogravure method on soft, absorbent, 2-ply dry crepe paper, i.e., facial tissue. The orange imprinted area had a transfer rating of 0 after 4 weeks of aging at room temperature (77° F.±10° F.).

EXAMPLE 16

1 part by weight of a direct dye, C.I. Direct Violet 47, Pontamine Fast Violet 4 RL, DuPont, was dissolved in 100 parts of water solution with agitation and heating to 130° F. The resulting solution was added slowly with agitation to 100 parts by weight of resin solution of Example 1 having a non-volatile solids content of approximately 21%. The resulting solution was agitated for 15 minutes.

The fluid had the following properties: pH, 0.8 and 8.4; stability, 2 months.

The fluid was applied by a hand-operated simulated rotogravure method on soft, absorbent, 2-ply dry crepe paper, i.e., facial tissue. The violet imprinted area had a transfer rating of 0 after 4 weeks of aging at room temperature (77° F.±10° F.).

EXAMPLE 17

1 part by weight of a direct dye, C.I. Direct Violet 1, Trisulfon Violet N. conc. was dissolved in 100 parts of water with agitation and heating to 130° F. The resulting solution was added slowly with agitation to 100 parts by weight of resin solution of Example 1 having a non-volatile solids content of approximately 21%. The resulting solution was agitated for 15 minutes and the pH adjusted with sodium bicarbonate.

The fluid had the following properties; pH, 8.4; stability, 1 month.

The fluid was applied by a hand-operated simulated rotogravure method on soft, absorbent, 2-ply dry crepe paper, i.e., facial tissue. The violet imprinted area had a transfer rating of 0 after 4 weeks of aging at room temperature (77° F.±10° F.).

EXAMPLE 18

1 part by weight of a reactive dye, Cibacron Brown 3GR C.I. Reactive Brown 1 Ciba, was dissolved in 100 parts by water with agitation and heating to 130° F. The resulting solution was added slowly with agitation to 100 parts by weight of resin solution of Example 1 having a non-volatile solids content of approximately 21%. The resulting solution was agitated for 15 minutes.

The fluid had the following properties: pH, 1.0; stability, 2 months.

The fluid was applied by a hand-operated simulated rotogravure method on soft, absorbent, 2-ply dry crepe paper, i.e., facial tissue. The brown imprinted area had a transfer rating of 0 after 4 weeks of aging at room temperature (77° F.±10° F.).

EXAMPLE 19

1 part by weight of a reactive dye, Drimarene Blue Z RL, C.I. Reactive Blue 10, Sandoz; was dissolved in 100 parts of water with agitation and heating to 130° F. The resulting solution was added slowly with agitation to 100 parts by weight of resin solution of Example 1 having a non-volatile solids content of approximately 21%. The resulting solution was agitated for 15 minutes.

The fluid had the following properties: pH, 1.0; stability, 2 months.

The fluid was applied by a hand-operated simulated rotogravure method on soft, absorbent, 2-ply dry crepe paper, i.e., facial tissue. The blue imprinted area had a transfer rating of 0 after 4 weeks of aging at room temperature (77° F.±10° F.).

EXAMPLE 20

1 part by weight of a reactive dye, Reactive Orange 2, Cibacron Orange G, Ciba, was dissolved in 100 parts of water with agitation and heating to 130° F. The resulting solution was added slowly with agitation to 100 parts by weight of resin solution of Example 1 having a non-volatile solids content of approximately 21%. The resulting solution was agitated for 15 minutes.

The fluid had the following properties: pH, 1.0; stability, 2 months.

The fluid was applied by a hand-operated simulated rotogravure method on soft, absorbent, 2-ply dry crepe paper, i.e., facial tissue. The orange imprinted area had a transfer rating of 0 after 4 weeks of aging at room temperature (77° F.±10° F.).

What is claimed is:

1. A printing fluid suitable for rotogravure printing at speeds up to about 5,000 ft./min. comprising an aqueous solution of a thermosetting vinylsulfonium polymer resin in admixture with a water-soluble dye compatible with said resin, said dye and resin mixture having a stability of from about 1 hour to in excess of 4 months and a transference value of from about 0 to about 4, and viscosity of less than 20 cps. at 77° F.

2. A printing fluid as claimed in claim 1 which comprises an aqueous solution of a polymer of vinylsulfonium thermosetting resin cross-linked with sulfonium free comonomer and a water-soluble dye compatible with said resin, said fluid being free from particulate matter, said dye and resin mixture having a viscosity of less than 15 cps. at 77° F., a stability of from about 1 hour to in excess of 4 months, said dye and a resin mixture having a transference value of from about 4 to about 0 as measured against a standardized solution of a standard thermosetting resin in admixture with a standard dye.

3. The printing fluid as claimed in claim 2 which comprises at least one water-soluble thermosetting resin selected from the group consisting of:
(1) Water-soluble homopolymers containing the recurring unit of the general formula:

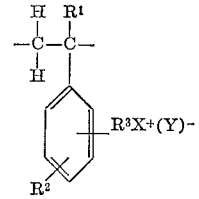

wherein $R^1$ and $R^2$ are selected from the group consisting of hoygen and alkyl radicals containing from 1 to 6 carbon atoms, $R^3$ is a methylene group or an ethylene group, X is an organic sulfur-containing compound selected from the group consisting of (A) sulfides of the formula $R^4SR^5$, wherein $R^4$ and $R^5$ each represents a member of the group consisting of (1) alkyl radicals containing from 1 to 6 carbon atoms, (2) haloalkyl radicals containing from 1 to 6 carbon atoms, (3) hydroxyalkyl radicals containing from 1 to 6 carbon atoms:

(4) 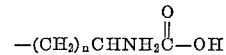

wherein $n$ is an integer from 1 to 4 inclusive;

(5) 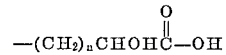

wherein $n$ is an integer from 1 to 4 inclusive;

(6) $\quad -(CH_2-CH_2O)_mCH_2CH_2OH$ wherein M is an integer from 1 to 5;

(7) $\quad -C_nH_{2n}COOH$ (8) $\quad -C_nH_{2n}COOC_nH_{2n+1}$ (9) $\quad -C_nH_{2n}COO$ alkali metal; and

(10) $\quad -C_nH_{2n}CONH_2$ wherein $n$ in substituents (7), (8), (9) and (10) is an integer from 1 to 5 with the total number of carbon atoms in each of the substituents (7), (8), (9) and (10) not exceeding 6, and where the total number of carbon atoms of the $R^4$ and $R^5$ groups attached to a common sulfur atom does not exceed 18 and (B) cyclic thio compounds selected from the group consisting of tetrahydrothiophene, hydroxy substituted tetrahydrothiophene, halo substituted tetrahydrothiophene, alkyl substituted tetrahydrothiophene where alkyl refers to groups containing from 1 to 5 carbon atoms, tetrahydrothiophran, and 1-oxa, 4-tetrahydrothiopyran; and Y is an anion from the group consisting of carbonate, oxolate, phthalate, succinate, di-hydrogen phosphate, fluoride, benzoate, chloride, nitrate, acetate, sulfate, bromide, and iodide;

(II) water-soluble copolymers comprising at least one unit of the formula:

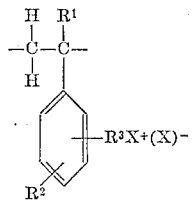

wherein $R^1$, $R^2$, $R^3$, X and Y are as hereinbefore defined;

(III) water-soluble homopolymers containing recurring units of the formula:

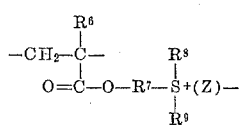

wherein $R^6$ is selected from the class consisting of hydrogen and a methyl radical, $R^7$ is an alkylene radical containing from 1 to 4 carbon atoms, $R^8$ is an alkyl radical containing from 1 to 4 carbon atoms, $R^9$ is selected from the class consisting of methyl radicals and carboxymethyl radicals, and Z is selected from the class consisting of halogen atoms and methyl sulfate radicals; and (IV) water soluble copolymers of (A) sulfines having the formula:

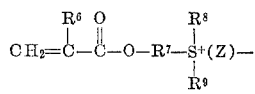

wherein $R^6$, $R^7$, $R^8$, $R^9$ and Z are as hereinbefore defined and (B) at least one copolymerizable monomer selected from the class consisting of:

(1) compounds having the formula

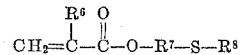

wherein $R^6$, $R^7$, and $R^8$ are as hereinbefore defined, (2) acrylamide; (3) lower alkyl substituted acrylamides; (4) vinylbenzene; (5) lower alkyl substituted vinylbenzenes; (6) compounds having the formula

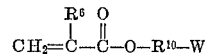

wherein $R^6$ is as hereinbefore defined, $R^{10}$ is an alkylene radical containing from 1 to about 10 carbon atoms, and W is selected from the class consisting of hydrogen and cyano radicals; (7) compounds having the formula

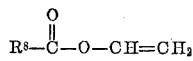

wherein $R^8$ is as hereinbefore defined; and (8) N-alkyl-N-vinylamides having the formula

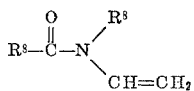

wherein $R^8$ is as hereinbefore defined; said water-soluble thermosetting resin being in solution with a water-soluble dye compatible with said resin, said compatibility being measured by storage life of from 1 week to in excess of 4 months, said fluid being free from pigmented particulate matter and capable of being cleaned, said dye and resin mixture having a transference value of from about 0 to about 3 as measured against a standardized solution of a polyhydroxypolyalkylene - polyureaformaldehyde thermosetting resin and a dye giving said transference value.

4. A printing fluid according to claim 2 suitable for printing unsized paper.

5. A printing fluid according to claim 4 wherein the unsized paper is facial tissue stock.

6. A printing fluid according to claim 2 suitable for printing towel stock.

7. A printing fluid according to claim 2 having a transference value of from 0 to 2.

8. A printing fluid according to claim 3 having a transference value of from 0 to 1.

9. A printing fluid as claimed in claim 3 which is suitable for printing papers having an absorbency time of less than 600 sec./0.01 ml. of water, allowing the printing of said absorbent webs at speeds up to about 5,000 ft./min., said dye and resin solution having a transference value of from about 2 to about 0 as measured against a standardized solution of a polyhydroxypolyalkylene-polyurea-formaldehyde condensate thermosetting resin and C.I. Direct Blue 1 dye, the viscosity of said fluid being in the range of from about 3.0 cps. to about 7.0 cps., the surface tension of said fluid being of from about 30 to about 60 dynes/cm., said fluid being substantially free from volatile solvents having a vapor pressure of less than water.

10. A fibrous web product having a permanent print derived from the fluid according to claim 1.

11. An unsized cellulose web product having a permanent print as measured by transference value of from 0 to 2 derived from a fluid according to claim 3.

12. A tissue paper product having a permanent print derived from a fluid characterized according to claim 9.

References Cited

UNITED STATES PATENTS 2,730,446 1/1956 Hutchins.
2,868,741 1/1959 Chambers et al.
3,060,156 10/1962 Rassweiler.
3,078,259 2/1963 Hatch et al.

MURRAY TILLMAN, *Primary Examiner.*

J. L. WHITE, *Assistant Examiner.*